Feb. 7, 1933.     C. R. PATON     1,896,914
CLUTCH
Filed Nov. 3, 1927

INVENTOR.
Clyde R. Paton
BY
ATTORNEY

Patented Feb. 7, 1933

1,896,914

UNITED STATES PATENT OFFICE

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY

CLUTCH

Application filed November 3, 1927. Serial No. 230,776.

This invention relates to vehicle clutches and more particularly to the friction plates thereof, the principal object being to provide a clutch plate with means for preventing engine vibration from being transmitted to the vehicle transmission.

Another object is to provide a vehicle clutch with a flexible driving connection between the clutch plate and the vehicle driving means to eliminate wear and tear on the vehicle transmission and to allow smoother operation of the same.

Another object is to provide a vehicle clutch with a damped friction disc between the clutch plate and the hub thereof to provide a resilient driving connection whereby engine vibrations and noises are prevented from being transmitted to the vehicle transmission to insure smoother operation and longer life of the same.

A further object is to provide a vehicle clutch with a damped friction disc between the clutch plate and the driving hub thereof to form a resilient driving connection, spring means regulating the amount of friction between the disc and plate, and positive stops limiting the degree of movement of the plate relative to the hub.

These being among the objects of the present invention, the same consists of certain features of construction and combinations of parts to be hereinafter described with reference to the accompanying drawing and then claimed, having the above and other objects in view.

In the accompanying drawing which illustrates a suitable embodiment of the present invention and in which like numerals refer to like parts throughout the several views, Figure 1 is a partial plan view of a clutch driven plate showing the positive stops.

Figure 1:
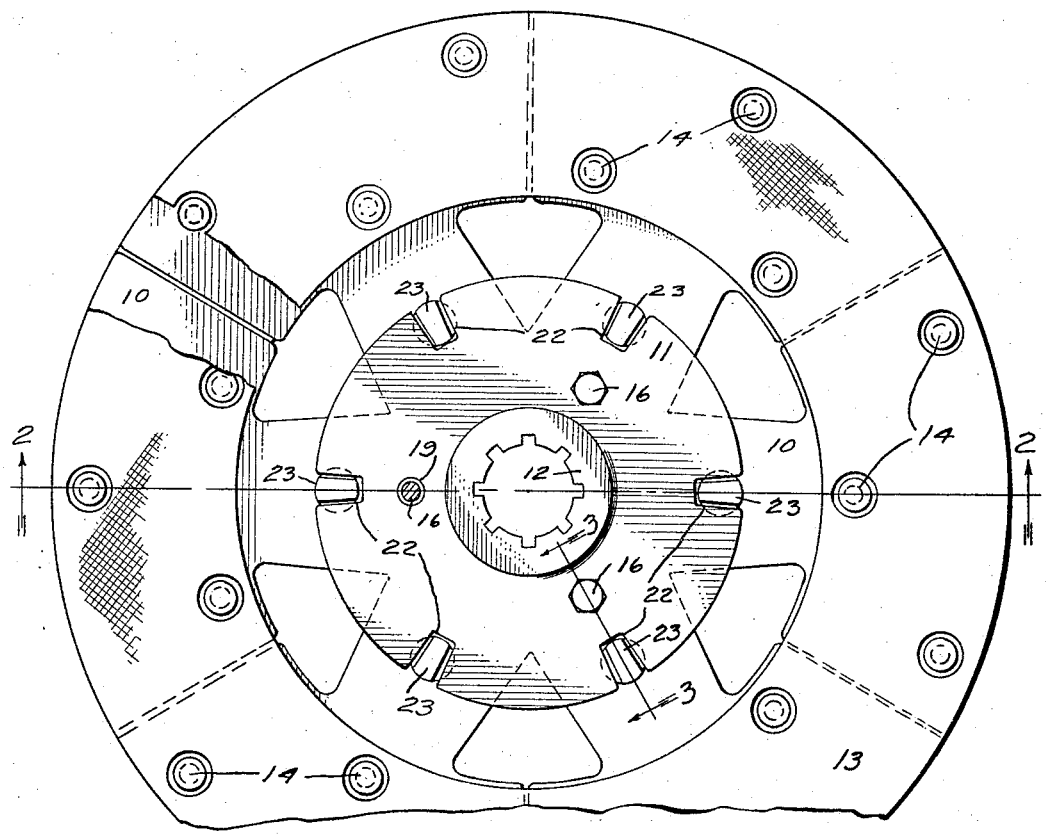
Figure 2:
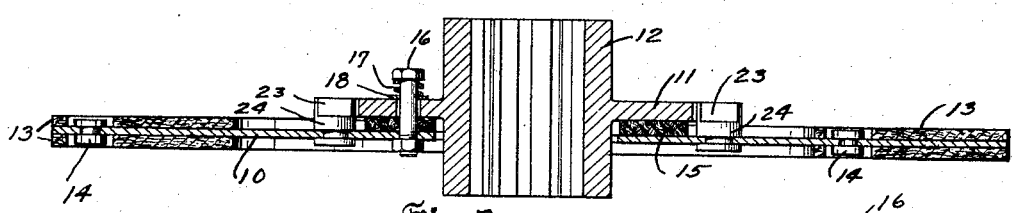
Figure 2 is a section taken on the line 2—2 of Figure 1 showing the friction disc between the hub and the driven plate.
Figure 4:
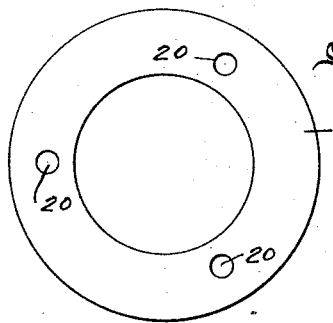
Figure 4 is a plan view of the friction disc.
Figure 3:
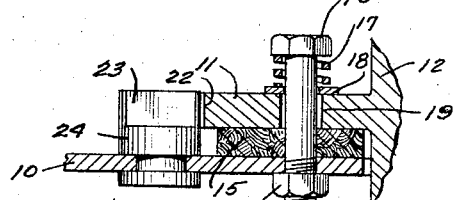
Figure 3 is an enlarged partial section taken on the line 3—3 of Figure 1 showing one of the positive stops and one of the friction regulating means.
Figure 5:
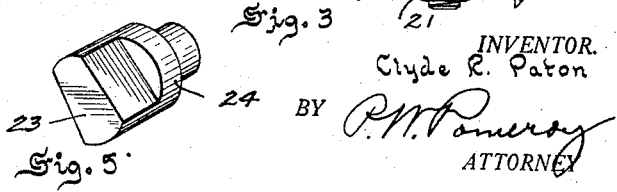
Figure 5 is an enlarged perspective view of one of the stop members.

In the type of clutch illustrated in the drawing, driving torque is transmitted from the engine crankshaft to the vehicle transmission by means of a single clutch plate 10 which is secured to the flange 11 of a hub 12, having a splined connection with the main transmission shaft. The driven plate 10 is positioned between two oppositely disposed pressure plates brought together under spring pressure to drive the plate 10 by their frictional engagement with the circular friction portions 13 secured to the opposite sides of the plate 10, by a plurality of rivets 14.

In clutches used heretofore, the driven plate was secured directly to the hub by rivets or the like, making a metal to metal contact. Consequently, engine vibrations and noises were transmitted to the vehicle transmission, also sudden applications of driving torque were directly transmitted to the transmission. Within the ordinary range of driving speeds the sudden application of torque and the continual vibration of the engine is detrimental to the transmission, giving rise to noisy operation and decreased life of both the transmission and engine. It is, therefore, very practical and very advantageous to provide a resilient driving connection between the engine and transmission.

A resilient driving connection is developed in the present invention which is very satisfactory and very efficient. The clutch hub 12 and the driven plate 10 are secured together to have restrained circular movement relative to each other and this is accomplished by means of a circular disc 15 of suitable friction material positioned between the attaching surface of the plate 10 and the hub flange 11. Three bolts 16 spaced 120° apart, each having a coil spring 17 and a washer 18 adjacent the head thereof, unite the flange 11 and plate 10. Each bolt 16 extends through an enlarged opening 19 in the flange 11 through an opening 20 in the friction disc 15 and through an opening of the same diameter in the driven plate 10, a nut 21 being threaded on the end of the bolt extending through the clutch plate 10. The amount of resistance between the plate 10 and the hub flange 11 may be regulated by threading or unthreading the nut 21 on the bolt 16.

It is necessary to limit the degree of relative movement between the driven plate 10 and hub 11 to eliminate the possibility of shearing the bolts 16.

Rectangular shaped notches 22 are formed at 60° intervals around the peripheral edge of the hub flange 11. Positioned within each of these notches 22 and spaced from the sides thereof, is a rectangular shaped stop 23 riveted to the driven plate 10, the base 24 of the plug 23 being of greater width than the portion of the plug within the notch 22 to provide a seat for the flange 11 of the hub 12 in parallel alignment with the plate 10. The stops 23 allow a predetermined limited movement of the hub 12 relative to the plate 10.

The operation of the clutch plate will undoubtedly be apparent from the foregoing description. It can be seen that sudden accelerations and decelerations of the engine are accomplished by relative movements between the clutch plate 10 and hub 12, the enlarged openings 19 surrounding the bolts 16 allowing this movement. The friction disc 15 resists the movement or rather damps the movement and the stops 23 limit the degree of movement. It can be seen that the movement is damped by the springs 17 and that the springs may be adjusted to increase or decrease the friction between the hub flange 11 and plate 10. The present invention operates both when the drive is from the engine to the rear axle and when it is from the rear axle to the engine. It is evident under ordinary driving conditions, the clutch plate prevents engine vibrations and sudden torque impulses from being transmitted to the transmission with the result that the life of the transmission is prolonged and that smoother operation of the same is obtained. The clutch plate is simple in its construction, easy to assemble and comparatively economical to manufacture.

Although a preferred construction is shown in the drawing, it is to be understood that formal changes may be made in the specific embodiment of the invention described without departing from the spirit and substance of the broad invention, the scope of which is commensurate with the appended claims.

What I claim is:

1. In a clutch, a clutch plate, a hub therefor having movement relative thereto, a circumferential flange on said hub, a friction disc between said flange and plate, stops for limiting the movement between said hub and plate, bolts extending from said flange, and coiled springs surrounding said bolts holding said disc in frictional contact with said flange to dampen said movement between said hub and plate.

2. In a clutch, a clutch plate, a hub therefor having movement relative thereto, stops limiting said movement, a circumferential flange on said hub having a plurality of openings, a friction disc between said plate and flange, bolts extending through said plate and through said openings in said flange, said bolts being of less diameter than said openings, and coiled compression springs on said bolts holding said flange and friction disc in frictional contact to dampen said movement between said plate and hub.

3. In a clutch, a clutch plate, a concentric hub therefor having movement relative thereto, stops limiting said movement, a circumferential flange on said hub having a plurality of openings therein, a disc of fibrous material on said plate engageable with said flange, bolts extending through said openings and through said plate, said bolts being of less diameter than said openings, coiled compression springs on said bolts holding said flange and said disc in frictional engagement, and nuts threaded on said bolts to control the compression in said springs whereby said motion between said plate and hub is damped by said springs.

4. In a clutch, a clutch plate, a concentric hub therefor having movement relative thereto, a circumferential flange on said hub having a plurality of rectangular shaped notches around the perimeter thereof, a friction disc of fibrous material between said flange and plate, coiled springs holding said disc in circumferential engagement with said flange to dampen said movement therebetween, and a plurality of stops secured to said plate having their sides spaced from the side walls of said notches whereby contact between said stops and the walls of said notches limits said movement between said plate and hub.

5. In a clutch, a clutch plate, a concentric hub therefor having movement relative thereto, a circumferential flange on said hub having a plurality of apertures and a plurality of rectangular shaped notches around the periphery thereof, a fibrous disc between said flange and plate, a plurality of bolts extending through said apertures and through said plate, said bolts being of less diameter than said apertures to have movement therein, coiled compression springs on said bolts forcing said disc and flange into frictional engagement, said springs damping said movement between said hub and plate, and a plurality of stops secured to said plate, and stops being received by said notches in spaced relationship to the walls thereof whereby said stops limit said movement of said hub relative to said plate.

6. In a clutch, a clutch plate, a hub therefor having movement relative to said plate, a friction member positioned between said hub and plate, a coiled spring holding said member in frictional contact with said hub to dampen the movement between said hub and plate, and a stop member secured to said plate engageable with said hub to limit the relative movement between said plate and hub.

7. In a clutch, a clutch plate, a hub therefor having movement relative to said plate, a non-yieldable friction member positioned between said hub and plate, a coiled spring adjustably maintaining said member in frictional contact with said hub to dampen the movement between said hub and plate, and a stop member rigid with said plate engageable with said hub to limit the relative movement between said plate and hub.

Signed by me at South Bend, Indiana, this 31st day of October, 1927.

CLYDE R. PATON.